H. B. CRUM.
APPARATUS FOR HANDLING BRICK.
APPLICATION FILED NOV. 25, 1913.
1,222,535.
Patented Apr. 10, 1917.
2 SHEETS—SHEET 2.
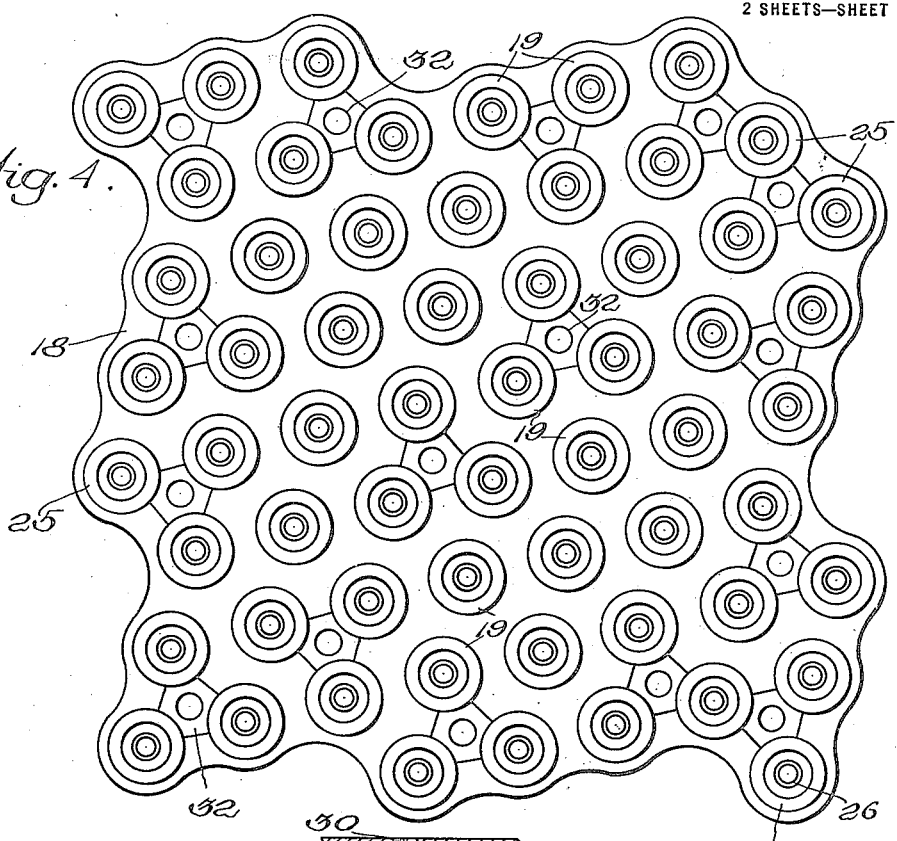
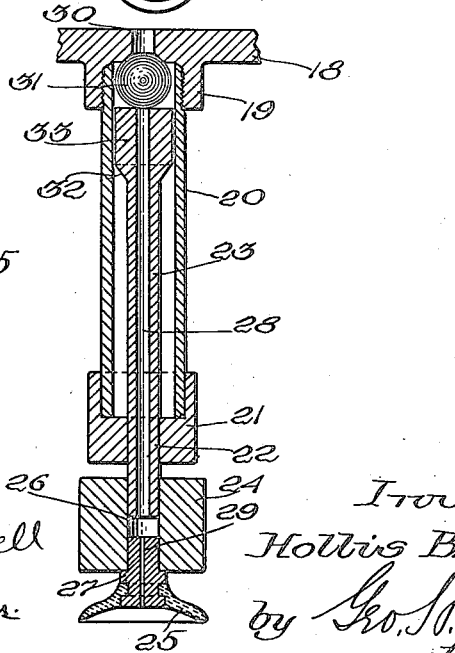
Witnesses:
Edward Maxwell
James R. Hodder.
Inventor:
Hollis B. Crum,
by Geo. H. Maxwell,
Attorney.

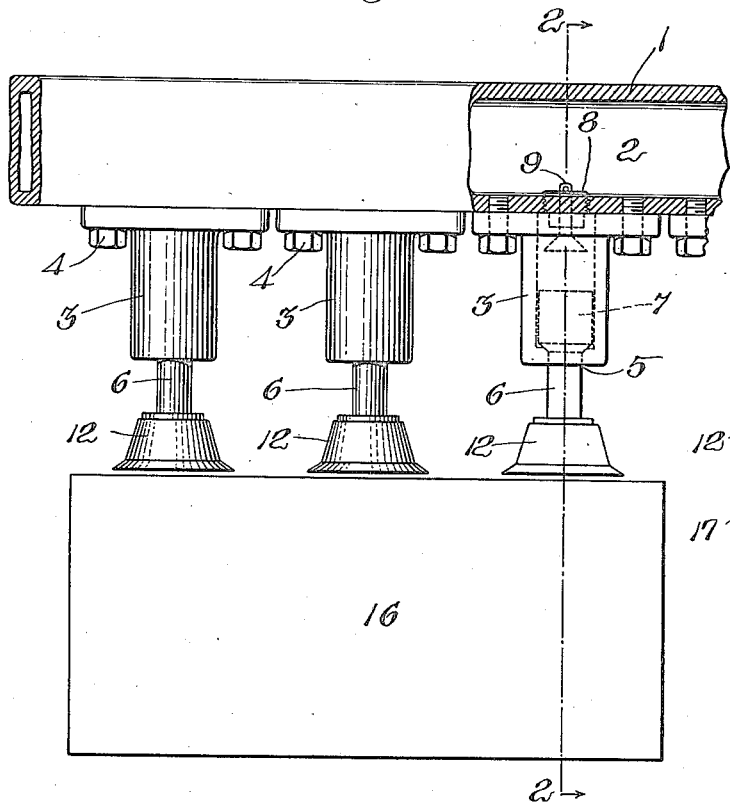
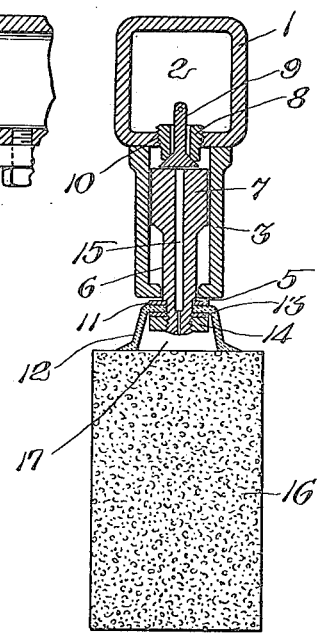
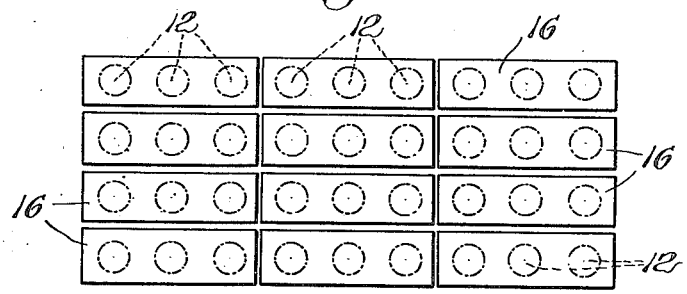

UNITED STATES PATENT OFFICE.

HOLLIS B. CRUM, OF CHICAGO, ILLINOIS, ASSIGNOR TO RAYMOND C. PENFIELD, OF CHICAGO, ILLINOIS.

APPARATUS FOR HANDLING BRICK.

1,222,535.   Specification of Letters Patent.   Patented Apr. 10, 1917.

Application filed November 25, 1913. Serial No. 802,936.

*To all whom it may concern:*

Be it known that I, HOLLIS B. CRUM, a citizen of the United States, and resident of Chicago, county of Cook, State of Illinois, have invented an Improvement in Apparatus for Handling Brick, of which the following description, in connection with the accompanying drawings, is a specification, like letters on the drawings representing like parts.

My present invention has for its object a novel apparatus for handling brick, utilizing the vacuum principle. In the development of mechanical brick handling, lifting, and setting machinery, many different types of apparatus have been devised for eliminating the manual handling of bricks, and to provide mechanical devices which will automatically move, grip, lift and handle bricks. These devices, however, have been complex in construction and expensive to build, and were apt to damage the corners, edges, and surfaces of the brick. Accordingly, I have devised a brick handling apparatus, capable of lifting, transporting and releasing a plurality of brick simultaneously, which utilizes suction or the vacuum principle, and which will not damage the corners, edges, or surfaces of the brick being handled, and which is economical to manufacture and convenient in operation. An important advantage of the present invention is that green or unburned brick may be handled with great expedition and without the slightest danger of injury thereto, the immediate brick-engaging portions of the apparatus being preferably of rubber or other suitable yielding material. This feature is of special importance, enabling my vacuum lifter to be employed on green brick as they are formed or cut from a stream or streams of brick material, as the same issue from a die and after they are subjected to either a side cutting or rotating reel. At this point in the manufacture of brick, the brick material is soft and green, and therefore must be handled with great care by any mechanical device, in order to prevent injury or distortion of the brick. The capability of the apparatus of my present invention may be advantageously employed also in mechanically hacking the green brick as the same issue from the die and cutting reels.

In carrying out the method involved in the present invention, I preferably apply to the uppermost portion, side or edge, of each brick, a plurality of vacuum creating devices. While it is feasible to employ two, or even one, vacuum creating device as a lifting means for a single brick, I prefer to utilize a plurality of devices and therefore may utilize a comparatively low vacuum, *i. e.* approximately five inches of mercury, or 2.45 pounds per square inch. In practice I affix to a lifting device, a plurality of vacuum cups having the same connected to a single passageway or air conduit leading to a pump; lower the apparatus until the cups contact with the uppermost surface of a brick, row or rows of bricks, then initiate the vacuum which will create a sufficient lifting power to hold and lift each brick through the action of a plurality of cups in contact therewith; maintaining the vacuum while moving the apparatus and the brick carried thereby to a desired position, as during hacking, for example, then releasing the vacuum, and releasing the brick formerly held thereby. The average weight of a green brick is approximately 6.125 pounds, and the lifting vacuum cups of but small diameter each, may be easily made to aggregate a lifting power double this weight, with the relatively low vacuum of 5 inches of mercury as above mentioned.

I have illustrated a convenient apparatus for carrying out this method in the annexed drawings, wherein—

Figure 1 is a side view of a portion of the lifting apparatus with a plurality of vacuum cups ready to apply to a brick;

Fig. 2 is a view in cross section on the line 2—2 of Fig. 1 of a brick when lifted by the apparatus;

Fig. 3 is a plan view of brick cut from four streams of brick material and preparatory to hacking by a vacuum lifting apparatus involving my present method, the relative position of the vacuum cups being illustrated in dotted lines; and Figs. 4 and 5 illustrate a modified form of apparatus particularly adapted for applying a large number of vacuum cups to each brick and to lift an entire square as distinguished from a row or rows of brick, when a unit of considerable size is to be handled.

While I may employ my present method as a hand operated lifting apparatus, wherein one or more operators carry the lifting apparatus with the vacuum cups thereon over into position, lower the same upon the brick to be handled, lift the apparatus and the brick, and transport them to a new position, then releasing the brick and repeating the operation, I may utilize a crane or other mechanical means to handle the apparatus. This is particularly desirable with a large number of brick being lifted, as in hacking from the offbearing belt of a brick making machine, where a plurality of streams of brick material are being formed and cut.

In the drawings I have illustrated a fragmentary section of the lifting apparatus which may be connected by a flexible or other suitable means (not shown) to a vacuum creating device, pump, or the like, such flexible connection permitting the vacuum cup carrying apparatus to be moved both vertically and horizontally. A simple form of apparatus comprises a lifter 1 having an internal passageway or conduit 2 is provided with a plurality of sleeves 3, each being secured to the under side of the lifter 1 by bolts 4. These sleeves are in the form of inverted U-shaped members, having centrally bored passageways 5 to receive the stem 6 of a plunger 7. The plunger 7 is adapted to reciprocate within the member 3, being of appropriate diameter to slide freely therein and with sufficient length to afford a proper firm bearing. The stem 6 is also of corresponding diameter to the bore 5, so that it may slide freely therein and act as a guide. A substantially airtight valve of suitable form, such as shown in Figs. 1 and 2, comprising the valve 8 and sliding valve stem 9 are fitted through a threaded passage 10 in the bottom wall of the lifter 1, to the interior of each member 3.

The lowermost portion of the stem 6 of each plunger or piston is arranged to hold a vacuum cup, in Fig. 3 shown as being reduced in diameter to receive a washer 11, the vacuum cup of rubber or the like 12, a second washer 13, and the threaded nut 14 to hold the washer and the vacuum cup on the lower portion of the stem. The plunger 7 is bored centrally at 15 throughout its entire length, opening into the vacuum cup. These vacuum cups 12 may be of any appropriate size, preferably being round, and of an area sufficient for application to the narrow edge or end portion of a brick. When the lifter 1 is lowered into position so that the vacuum is initiated throughout the extent of the passageway 2, the air will be drawn through the valve 8, bore 15 and out from the space 17 between the sides of the vacuum cup 12 and the top of the brick, thus creating a suction holding each cup to the surface of the brick. Sufficient vacuum to insure the lifting of the brick, even should some of the cups fail to seal may be created. With a lifting vacuum maintained, the member 1 may now be moved carrying the brick, as will be readily understood. I find that a practicable area for the vacuum cups 12 where a minimum number (such as three for each brick) is desired, is approximately 1½ inches in diameter, then with three of such cups applied to a green brick of approximately 6.125 pounds in weight, and with a vacuum of 2.45 pounds to the square inch or 5 inches of mercury, I am enabled to secure a lifting power of nearly 4½ pounds for each cup, or approximately 13 pounds for all three cups, which affords an ample margin of safety so that even should one cup fail to operate perfectly, the brick will be lifted and sustained by the others.

In Fig. 3 I have illustrated in conventional manner the application of a vacuum lifter to a plurality of rows of brick, such for example, as brick cut from four streams of brick material issuing from a die, although such a lifter may be applied with equal facility to handle rows of burned brick.

In Figs. 4 and 5 I have illustrated a slightly modified form, wherein 18 is the underneath plan view of an aluminum plate, formed hollow generally similar to the lifter 1 and with a large number of relatively small vacuum cups carried thereby. I find that it is often desirable to provide a relatively large number of small individual vacuum cups to lift a brick, an advantage being that even should a considerable number of the cups fail to seal, a sufficient number will still be operative to provide an ample margin of safety to lift the brick. In the case where only three vacuum cups for each brick are employed, if two should fail to act, the entire efficiency of the apparatus would depend upon the remaining cup. I find also that a large number of small vacuum cups, when applied to lifting a unit or square of brick, as, for example, twelve bricks square, (i. e. four hundred and thirty-two bricks) and a plurality of plates such as 18, adapted to fit and preferably interlock, may be secured to a lifting frame and an entire unit of brick handled with great expedition and security. A single plate, such as illustrated at 18, is adapted to lift one brick and to overlap slightly adjacent brick, this plate being preferably formed of aluminum, and provided with a large number of bosses 19 in its under part to which are threaded respectively sleeves or tubes 20, similar to the members 3 already described. These tubes 20 are secured by caps 21, each having a centrally bored passage 22 of appropriate diameter to receive the stem of the plunger or piston 23. I show in Fig. 5 a modified form of securing the rubber vacuum cups 25 to the stems 23, in this form comprising a union member 13( 24 having a centrally bored aperture 26, adapted to hold as by a wedging fit on the bottom of the plunger 23 and correspondingly on the plug 27, which latter is adapted to fit and hold the cup 25 as clearly shown in Fig. 5. The piston 23 is provided with a bored passageway 28, and the plug 27 with a smaller passage 29, similar in general respects to the passageway 15 already described, in the form shown in Figs. 1 and 2. In the present modification, the valve from the interior of the plate 18 to the hollow sleeve 20 comprises simply a bored passage 30 and a ball 31 carried on the top of the piston or plunger 23. When the plunger is in its lowermost position the beveled face 32 on the lower portion of the enlarged top 33 will rest upon the cap 21 and prevent further downward movement. A plate 18 having been lowered on to a brick, the several vacuum cups 25 will rest directly upon the surface of the brick and should the plate be lowered too far, the piston or plunger 23 will simply slide within the tube 20 so that the surface of the brick are uninjured as it merely has to bear the weight of the piston and union 24. This weight is sufficient in both forms of the device, either as shown in Figs. 1 and 2, or as illustrated in Fig. 5, to deflate the vacuum cups slightly and thus practically to seal the same to the surface of the brick even before the vacuum is initiated. In this position the vacuum being initiated, the air will be withdrawn from out the recess between the surface of the brick, and the vacuum cups 12 or 25, a lifting tension thus being created, as already explained. In case a vacuum cup 12 or 25 should not seal for any reason, as, for example, if an obstruction is between the edge of the cup and the brick, the continued creation of a vacuum will act to quickly draw up the plungers in the respective sleeves, carrying the vacuum cups, until the plungers will act to close the openings into the interior of the lifter; i. e. will close the valve 8 in the form shown in Figs. 1 and 2 by striking against the valve stem 9 and seating the same, or will lift the ball 31 against the opening 30, in the form shown in Fig. 5, and thus shut off the passage therethrough. This results because the air passage from the interior of the vacuum cups is much smaller than that into the lifters through the valve 8 or 30, the vacuum created being sufficient to lift the plungers bodily in spite of the leakage of air through the narrow portions of the passageway openings directly into the vacuum cups. As soon as the valve stem 9 or the ball 31 is seated, shutting off the leakage through such particular valve, the plungers may drop back, and although the cup on each plunger will not be assisting to lift the brick, yet no leak is permitted so that the vacuum may be maintained without unnecessary loss of power. The creation and maintenance of the vacuum may be sufficient, by means of the device herein shown to effect a positive bodily lifting of the brick if desired, as illustrated for example, in Fig. 2; it being sometimes desirable to effect a raising of the brick from its support before moving or lifting the member 1, plate 18, or the device to which it may be attached. However, in ordinary practice it will be found usual when the vacuum cups are sealed on to the brick, or group of brick, that the creation of the vacuum simply effects a tightening of the seal between each vacuum cup and the surface of the brick with which it is in contact, without any interior movement of the mechanism whatever. The member 1 or plate 18 then being lifted effects the raising of the brick. The plate 18 is preferably so formed with its contour adapted to fit and interlock with additional similar plates on any and all sides, and these plates may be bolted to a carryng frame by means of a plurality of bolts, passages 32 being provided therefor entirely through the hollow portion of the plate 18 from one face to the other. With a suitable number of such plates 18 attached to a single lifting frame, I am enabled to carry out my present method of vacuum lifting on a relatively large square of brick, as above explained.

It will be readily appreciated that other means of utilizing the vacuum principle may be employed and that other devices than the members 3, sliding plungers 7, and the like may be advantageously utilized in carrying out my novel method, but the handling of brick, either green or burned by means of a vacuum lifting device is a distinctly novel method, and I wish to claim the same broadly. This method is especially valuable in handling green brick, as no injury can possibly result from the rubber vacuum cups, and the brick being green, also tend to facilitate the exclusion of air thereby enabling a lifting vacuum to be economically maintained, as well as to render the joint between the vacuum cups and the brick substantially air tight.

The lifting apparatus above described, to conveniently carry out my improvement in the art of brick handling by vacuum cups, is of special advantage in the facility with which brick may be handled from overhead. Thus in the operation of mechanical hacking from the offbearing belt of a brick making die for example, my method may be found most useful in enabling the mechanical operation of removing the green brick from a continuously traveling belt, by having a vacuum lifting apparatus travel overhead in unison with the rate of speed of the brick carrying belt. Other advantages and uses will readily occur to those skilled in the art, and it will also be appreciated that the size, i. e. the length, width and lifting power of a brick handling apparatus involving the vacuum principle is almost unlimited. Furthermore my invention may be utilized in handling similar articles to brick, either a number of separate articles like a square of four hundred and thirty-two brick, as above explained, or a unitary article of very considerable size and weight. The invention is peculiarly useful in handling brick, however, and particularly green brick, where the vacuum cups seal almost automatically and I therefore describe the invention as applied to these articles.

Having described my invention, what I claim as new and desire to secure by Letters Patent is:

1. Apparatus for handling a plurality of individual bricks comprising a movable lifting frame carrying a plurality of elastic vacuum cups, means to initiate a vacuum connected with all of said cups, each cup being mounted on a holder and having automatic means in the holder for each cup adapted to open the vacuum creating pressure directly on each cup when it is sealed against a contacting surface and to prevent air leakage to the vacuum creating means in case of non-sealing of its cup.

2. Apparatus for handling brick, comprising a lifting frame carrying a plurality of plungers adapted for a limited sliding movement in said frame, a vacuum cup on each plunger, means to create and maintain a partial vacuum in all said cups to seal each cup against a contacting brick surface and automatic means to prevent air leakage through a non-sealed cup and plunger.

3. Apparatus for handling brick through suction applied to the top surface of the brick to lift the same, comprising a lifting frame carrying a plurality of elastic vacuum cups, means to create a partial vacuum connected with each cup, each of said cups being independently mounted on the carrier and adapted to be independently sealed to and seated on separate bricks, and automatic means to prevent air leakage through an unsealed vacuum cup to the others carried by said apparatus.

4. Apparatus for handling brick, adapted to engage the top surface of brick and lift the same by suction, means to maintain a partial vacuum connected with said apparatus and permitting movement of the apparatus while maintaining said partial vacuum, a plurality of vacuum cups carried by said apparatus, each cup being adapted to effect an air-tight seal on the surface of the brick upon contacting therewith, said carrier being of sufficient weight to automatically deflate each vacuum cup when lowered onto the brick surface, said weight and partial deflation of each cup effecting a partial sealing of said cups to the brick surface.

5. Apparatus for handling a plurality of brick comprising a lifting frame including a large number of relatively small vacuum cups in pre-arranged spacing whereby a plurality of cups will be in position to contact with each brick to be lifted, means to create and maintain a partial vacuum through the apparatus and each vacuum cup during the brick lifting operation, each of said vacuum cups being yieldingly mounted in a frame, whereupon lowering of said frame upon a plurality of brick will automatically tend to partially seal each vacuum cup at the brick surface with which it contacts, whereby a relatively low vacuum creating force will complete the sealing of each cup, each cup having a check valve in combination therewith, adapted to automatically shut off air leakage through a non-sealing cup.

In testimony whereof, I have signed my name to this specification, in the presence of two subscribing witnesses.

HOLLIS B. CRUM.

Witnesses:
S. K. SMART,
C. P. MERTENS.